March 27, 1956 W. E. O'SHEI 2,739,337
WINDSCREEN WIPER BLADES
Filed Aug. 4, 1952
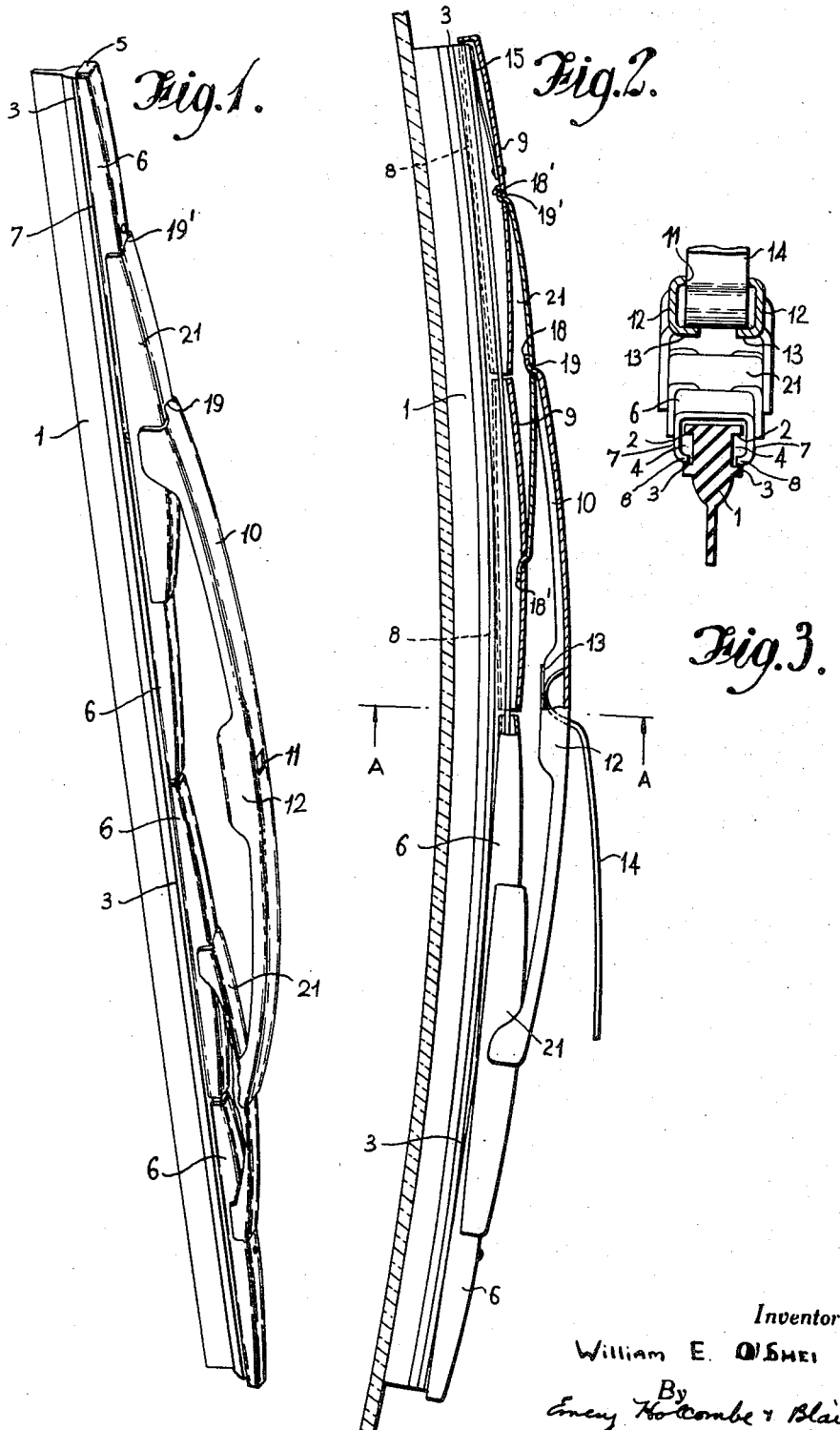
Inventor
William E. O'Shei
By
Emery Holcombe & Blair
Attorneys.

United States Patent Office 2,739,337
Patented Mar. 27, 1956

2,739,337

WINDSCREEN WIPER BLADES

William Edward O'Shei, London, England

Application August 4, 1952, Serial No. 302,556

Claims priority, application Great Britain February 20, 1952

7 Claims. (Cl. 15—245)

The present invention relates to windscreen wiper blades which are capable of wiping curved windscreens, but can also be used for wiping flat windscreens.

The production of a windscreen wiper blade which will wipe a curved windscreen as efficiently as the conventional straight blade wipes a flat screen, has presented considerable problems and difficulties. Firstly, the squeegee element, made of elongated strip-like form from rubber or rubber-like material, must be mounted edgewise to the screen and be flexible in its own plane towards and away from the windscreen over which it is moving, in order to conform with the varying curvature of the screen. Secondly, the squeegee element must be maintained sufficiently rigid in the transverse direction, that is in the direction in which the blade moves over the windscreen, so that the squeegee will remain approximately straight (that is will not unduly flex) in this transverse direction as it is reciprocated across the screen.

For enabling the squeegee element of the windscreen wiper blade to flex in its own plane and along its entire length, the wiper arm pressure has been transmitted to the ends of the squeegee element by a bridge piece or holder, the squeegee element, between the points at which the pressure is applied thereto, flexing towards or into the bridge piece or holder when it is flexed from its normally straight to its curved form to conform with the convex curvature of a windscreen.

In order to distribute the wiper arm pressure more uniformly along the length of the squeegee, a plurality of yokes have been disposed along the back of the squeegee, with their ends interconnected with the squeegee at spaced points therealong, intermediate points on the yokes being hingedly connected, either directly or indirectly through secondary yokes, to a bridge piece provided with means for connecting it to the wiper arm. One or more flexible metal strips or holders (herein referred to as a "flexor") may extend along or adjacent the rear of the squeegee element, the flexor being so disposed as to permit the squeegee to flex in its own plane whilst restraining transverse flexing of the squeegee. The flexor normally resiliently holds the squeegee with its wiping edge substantially straight, and flexes to conform with the curvature of the windscreen when the portions of the squeegee intermediate the points at which the wiper arm pressure is applied thereto move relatively towards or into the yokes.

With the known wiper blade construction, as above described, the squeegee is only positively held in engagement with the screen, when it is wiping over a flat portion thereof, either near its ends or at the ends of the yokes. Intermediate the points at which the wiper arm pressure is applied, the squeegee is only resiliently held against the screen, which tends to cause streaky wiping. If the strength of the flexor is increased in order more firmly to urge the said intermediate points of the squeegee into contact with the windscreen, it follows that a greater wiper arm pressure will be necessary to cause the blade to flex to conform with a curved part of the screen. This increases the friction between the squeegee and the windscreen which increases the load on the driving motor.

The object of the invention is to provide an improved windscreen wiper blade which is suitable for wiping windscreens of varying curvature, in which the back of the squeegee element is embraced by a plurality of rigid channel-shaped backing members which are hingedly connected at points intermediate their ends, either directly or indirectly through yoke members, to a bridge piece adapted for connection to the wiper arm, said backing members having support surfaces against which the squeegee bears substantially entirely along the length of the backing member when the squeegee and backing members are in the position they assume to conform to the minimum windscreen curvature over which the blade is adapted to wipe, the squeegee element being free to move outwardly of the channel backing members and away from some of said support surfaces when the blade flexes to conform with a portion of the windscreen of greater convex curvature. The support surfaces for applying the wiper arm pressure at all points along the squeegee when the blade is adapted for wiping over minimum windscreen curvature may be constituted by the inner surfaces of the back walls of the channels which, in the case where the minimum curvature corresponds to a flat screen, may be straight from end to end of the channel member. Thus when the blade is wiping over a flat screen, the channel-shaped backing members are disposed end to end with the squeegee element extending therethrough and having its rear surface bearing against the straight back walls of the channels, whereby the wiper arm pressure will be applied all along the back of the squeegee element.

When the blade flexes to conform with a portion of the windscreen of greater curvature, the backing members will rock slightly relative to one another about their hinge connections to the bridge piece and/or yokes to assume positions approximately tangential to the adjacent part of the surface of the windscreen, the portions of the squeegee opposite those intermediate points (herein referred to as "pressure points") of the backing members where they are connected to the bridge piece or secondary yokes remaining with their rear surfaces in contact with the back walls of the channels whilst the portions of the squeegee intermediate these pressure points move relatively away from the backs of the channels to allow the wiping edge to conform with the curvature of the windscreen.

In a modified construction the support surfaces are not constituted by the backs of the channel members but are constituted by inwardly directed flanges extending along the free edges of the channel members, said flanges being curved corresponding to the minimum windscreen curvature (which is generally a straight line) and being adapted to engage behind ribs extending longitudinally along each side of the squeegee element and spaced from both the wiping and rear edges thereof. The rear zone of the squeegee element thus still extends into the channel and cooperates with the side walls thereof to restrain transverse flexing of the squeegee element. The rear edge of the squeegee element may also be provided with flanges extending outwardly from opposite surfaces of the squeegee, said flanges being adapted to lie behind the inwardly directed flanges of the channel member to hold the squeegee and backing members in assembled relationship. The ribs and flanges on opposite surfaces of the squeegee are spaced apart by an amount sufficient to allow the squeegee element to flex to conform with the maximum curvature of the screen without restriction by the flanges on the channels.

With the modified blade construction described, when the blade is wiping over a flat portion of the screen, the flanges on the channels bear against the rear surfaces of the ribs at all points along the lengths of the channels to press the wiping edge positively into contact with the surface of the screen. When the blade is wiping over a curved portion of the screen only those portions of the ribs which lie opposite to the pressure points remain in pressure contact with the channel flanges, the portions of the squeegee between each two adjacent pressure points moving relatively away from the channel flanges to conform with the screen curvature. The portions of the squeegee between the said pressure points remains in contact with the screen by reason of the fact that the squeegee tends to remain straight between the pressure points when adjacent channel members rock to assume positions tangential to the screen surface. However, since the screen is curved between each two pressure points, the wiping edge of the squeegee will be firmly applied to the screen between adjacent pressure points.

In order that the invention may be more clearly understood, an embodiment thereof will now be described with reference to the accompanying drawings, in which:

Figure 1 shows a perspective view, partly cut away, of a windscreen wiper blade according to this invention in the position it assumes when wiping a flat portion of a windscreen.

Figure 2 shows the blade, one half of it in longitudinal section when it is wiping over a curved portion of a windscreen.

Figure 3 shows a section along the line A—A in Figure 2.

The windscreen wiper blade illustrated in the drawings comprises a squeegee element 1 of moulded rubber-like material having a cross-section as more clearly shown in Figure 3 with flanges 2 extending from opposite surfaces along the rear edge thereof and ribs 3 extending from opposite surfaces and spaced forwardly of the flanges 2 to form relatively wide grooves 4. The front portion of the squeegee is moulded with its cross-section decreasing gradually towards a thin wiping edge.

Disposed along the back of the squeegee element are four channel-shaped metal backing members 6 which are arranged end-to-end, each having a length of about one quarter of the length of the squeegee element. The side walls 7 of the members 6 lie in substantially parallel planes and have their internal surfaces spaced apart by a distance slightly greater than the overall width of the rear flanges of the squeegee. The free edges of these side walls are straight and provided with inwardly directed flanges 8 adapted to engage in the grooves 4 between the rear flanges 2 and the ribs 3 of the squeegee. The closed back 9 of each backing member 6 is spaced from the flanges 8 by such a distance that the ribs 3 can bear against flanges 8 at all points along its length. The central regions of the backing members 6 are interconnected in pairs by yokes 21, the central regions of which are, in turn, interconnected by a bridge piece 10 which is provided with means for attaching it to the wiper arm. The yokes 21 and the bridge piece 10 may also be of channel form with the side walls at the ends thereof fitting respectively outside the backing members 6 and the yokes. The central region of the bridge piece is formed with deeper side walls 12, the free edges of which are flanged inwardly at 13 to form a box-like cavity into which the curved or similarly shaped end of a wiper arm 14 can be inserted through the aperture 11 in the back of the bridge piece.

The connections between the ends of the bridge piece 10 and the yokes 21 and between the ends of the yokes 21 and the backing members 6, is such as to permit the parts to rock or hinge with respect to one another about transverse axes. In the embodiment shown, these connections are formed by fingers 18, 18′ projecting respectively from the ends of the bridge piece 10 and the yokes 21 extending through apertures 19, 19′ in the yokes and backing members respectively. The projections 18, 18′ are of hooked form so that they can only be inserted through the associated apertures 19, 19′ by inserting a projection through an aperture when the two parts to be connected are at right angles to one another and then swinging the parts to the relative positions shown in the figure. When the squeegee element is fitted in the backing member, the assembled yokes and bridge piece are prevented from swinging to positions in which they can be separated. The squeegee may be slid into the backing members from one end of the assembly or through the spaces between adjacent members. The outer ends of the two outer backing members 6 are formed with turned-down portions 5 which close the outer ends of the channels and prevent the squeegee element from sliding out of the blade assembly when the blade is in use.

With the blade described the pressure exerted by the wiper arm is distributed, by reason of the bridge piece and yokes, to the central points (at apertures 19′) of the backing members at which the yokes are attached. The pressure applied at these pressure points is transmitted to the squeegee element through the flanges 8 bearing against the ribs 3, and when the blade is wiping over a flat portion of the windscreen the flanges 8 of all the backing members will be in a straight line and will bear evenly at all points along the rear edges of the ribs 3. Thus, when the blade is wiping over a flat portion of the screen, the wiper arm pressure will be distributed along the entire wiping edge which will be positively urged into contact with the surface of the windscreen.

When the blade is wiping over a curved portion of the screen, the backing members and yokes will rock about their respective hinge connections so that the backing members 6 will lie tangential to the parts of the screen opposite the pressure points. Between adjacent pressure points, the wiping edge will be retained in contact with the screen so that the portions of the ribs 3 between the pressure points will move relatively away from the flanges 8. The width of the grooves 4 must be such as to allow the ribs 3 to move away from the adjacent portions of the flanges 8 to allow the squeegee to conform with the curvature of the screen before the flanges 2 are engaged by the inner surfaces of the flanges 8. The width of the groove will, of course, depend upon the length of the blade and the maximum curvature of the screen over which it has to wipe. For curved windscreens as at present commercially fitted to motor cars, the groove 4 should be about ⅛″ wide when the backing members 6 do not much exceed about 3″ in length.

In order positively to move the extreme outer ends of the squeegee element into contact with the screen when the blade is wiping over a curved portion of the screen, leaf springs 15 may be secured to the inner surfaces of the backs of the outer channel members with their free ends resiliently urging the outer extremities of the squeegee element away from the backs of the channels. When the blade is wiping over a flat portion of the screen, the squeegee element forces the leaf springs backwards to allow the adjacent portions of the ribs 3 to engage the flanges 8; when the blade moves on to a curved portion of the screen, the spring urges the end regions of the squeegee forwardly to keep the outer ends of the wiping edge in contact with the screen.

The flanges 8 prevent the squeegee element from being pulled out from the backing members and these flanges and the side walls 7 resist transverse flexing of the squeegee element.

With the blade described, the metal flexors previously used are entirely dispensed with and consequently only the inherent resilient of the rubber-like squeegee element has to be overcome in flexing the squeegee to conform with the curvature of the windscreen. This enables the pressure exerted by the wiper arm for urging the wiping edge into contact with the windscreen to be reduced, which consequently reduces the friction between the wiping edge and the windscreen and thus the load on the motor.

As the blade is reciprocated across the screen the squeegee can rock about the channel flanges and ribs at the trailing side of the blade to assume a trailing position.

The expression "rubber-like material" used in this specification is intended to include natural rubber and synthetic rubbers such as neoprene, the material known under the registered trade mark "Buna," polyvinyl chloride, and other elastomers which possess properties similar to natural and synthetic rubbers.

Whilst a particular embodiment has been described, it will be understood that various modifications may be made without departing from the scope of the invention. Thus, in some constructions, only two backing members need be provided.

I claim:

1. A windscreen wiper blade comprising an elongated squeegee element having a continuous wiping edge, a plurality of rigid channel shaped backing members extending along the back of the squeegee element with the channel side walls embracing the back of the squeegee element throughout the length of each channel, means hingedly connecting said backing members together for relative hinging movement in the plane of the squeegee, the channel side walls of each of the backing members lying in substantially parallel planes and being spaced apart by a distance slightly greater than the thickness of the back portion of the squeegee element positioned therebetween thereby to permit the squeegee element to move into or outwardly with respect to and within the channels, the arrangements being such that when the squeegee is wiping a flat screen the squeegee element will engage with support surfaces, at least one along each backing member, which restrain further rearward movement of the squeegee into the backing members, parts of the squeegee element moving outwardly of the channel members and away from said support surfaces when the blade flexes to conform with a windscreen of convex curvature.

2. A windscreen wiper blade comprising an elongated squeegee element having flanges projecting outwardly from its opposite surfaces adjacent the rear of the squeegee element, a plurality of rigid channel-shaped backing members each having its channel side walls lying in substantially parallel planes with the internal surfaces of the said walls spaced apart by a distance slightly greater than the width across the flanges at the rear of the squeegee element, said plural backing members being arranged endwise along the back of the squeegee element with the flanges at the back thereof disposed between the channel side walls, flange members extending inwardly from the free edges of the channel side walls and engaging in front of the flanges at the rear of the squeegee element, ribs formed on and extending longitudinally along opposite surfaces of the squeegee element substantially parallel to the flange at the rear thereof and spaced from said rear flanges by a distance greater than the thickness of the flange members at the free edges of the side walls, said flange members extending into the channel space between a rib and a flange on the adjacent surface of the squeegee element, the back walls of the channel backing members being spaced from the free edges of the side walls by a distance not substantially less than the distance between the rear edge of a rib and the rear of the squeegee element whereby said rear edges of the ribs can engage the flange members and be supported thereby, means hingedly connecting the backing members together, means for connecting the backing members to a windscreen wiper arm, and means for applying the wiper arm pressure to points on said backing members intermediate their ends.

3. A windscreen wiper blade as claimed in claim 2, comprising also resilient means for urging the outer extremities of the squeegee element outwardly with respect to the adjacent parts of the backing members.

4. A windscreen wiper blade comprising an elongated squeegee element having flanges projecting outwardly from its opposite surfaces adjacent the rear of the squeegee element, at least two rigid channel-shaped backing members each having its channel side walls lying in substantially parallel planes with the internal surfaces of the said walls spaced apart by a distance slightly greater than the width across the flanges at the rear of the squeegee element, the free edges of said side walls being straight, said plural backing members being arranged endwise along the back of the squeegee element with the flanges at the back thereof disposed between the channel side walls, flange members extending inwardly from the free edges of the channel side walls, ribs formed on and extending longitudinally along opposite surfaces of the squeegee element substantially parallel to the flanges at the rear thereof and spaced from said rear flanges by a distance greater than the thickness of the flange members at the free edges of the side walls, said flange members extending into the channel space between a rib and a flange on the adjacent surface of the squeegee element, the back walls of the channel backing members being spaced from the free edges of the side walls by a distance not substantially less than the distance between the rear edge of a rib and the rear of the squeegee element whereby said rear edges of the ribs can engage the flange members and be supported thereby, a bridge piece having its opposite ends hingedly connected respectively to the backing members at points intermediate their ends, and means for connecting said bridge-piece to a wiper arm.

5. A windscreen wiper blade comprising an elongated squeegee element having flanges projecting outwardly from its opposite surfaces adjacent the rear of the squeegee element, four rigid channel-shaped backing members each having its channel side walls lying in substantially parallel planes with the internal surfaces of the said walls spaced apart by a distance greater than the width across the flanges at the rear of the squeegee element, said backing members being arranged endwise along the back of the squeegee element with the flanges at the back thereof disposed between the channel side walls, flange members extending inwardly from the free edges of the channel side walls, ribs formed on and extending longitudinally along opposite surfaces of the squeegee element substantially parallel to the flanges at the rear thereof and spaced from said rear flanges by a distance greater than the thickness of the flange members at the free edges of the side walls, said flange members extending into the channel space between a rib and a flange on the adjacent surface of the squeegee element, the back walls of the channel backing members being spaced from the free edges of the side walls by a distance not substantially less than the distance between the rear edge of a rib and the rear of the squeegee element whereby said rear edges of the ribs can engage the flange members and be supported thereby, a first yoke member having its opposite ends hingedly connected respectively to two of the backing members at points intermediate their ends, a second yoke member having its opposite ends hingedly connected respectively to the other two of said backing members at points intermediate their ends, a bridge-piece having its opposite ends hingedly connected respectively to points on said two yoke members intermediate their ends, and means for connecting said bridge-piece to a wiper arm.

6. A windscreen wiper blade as claimed in claim 5, comprising also resilient means for urging the outer extremities of the squeegee element outwardly with respect to the adjacent parts of the backing members.

7. A windscreen wiper blade for wiping a windscreen of varying curvature, comprising an elongated squeegee element having a continuous wiping edge, a plurality of rigid channel-shaped backing members extending along the back of the squeegee element with the channel side walls embracing the back of the squeegee element throughout the length of each channel, means hingedly connecting said backing members together for relative hinging movement in the plane of the squeegee, means for connecting the backing members to a windscreen wiper arm, means for applying the wiper arm pressure to points on said backing members intermediate their ends, the channel side walls of each of the backing members lying in substantially parallel planes and being spaced apart by a distance slightly greater than the thickness of the back portion of the squeegee element positioned therebetween thereby to permit the squeegee element to move into or outwardly with respect to and within the channels, the arrangement being such that when the squeegee is wiping a portion of the windscreen having minimum curvature the squeegee element will engage with support surfaces, at least one along each backing member, which restrain further rearward movement of the squeegee into the backing members, parts of the squeegee element moving outwardly of the channel members and away from said support surfaces when the blade flexes to conform with a portion of the windscreen of greater convex curvature.

References Cited in the file of this patent

UNITED STATES PATENTS

| | | |
|---|---|---|
| 2,303,694 | Horton | Dec. 1, 1942 |
| 2,537,411 | Klingler | Jan. 9, 1951 |
| 2,634,446 | Mackie et al. | Apr. 14, 1953 |

FOREIGN PATENTS

| | | |
|---|---|---|
| 466,048 | Canada | June 20, 1950 |